United States Patent
Lehman et al.

(10) Patent No.: US 10,029,193 B2
(45) Date of Patent: Jul. 24, 2018

(54) DUAL LOOP FUEL FILTRATION SYSTEM WITH CONTROLLER

(71) Applicant: Caterpillar Inc., Peoria, IL (US)

(72) Inventors: Marty Lehman, Congerville, IL (US); Scott F. Shafer, Morton, IL (US)

(73) Assignee: Caterpillar Inc., Deerfield, IL (US)

( * ) Notice: Subject to any disclaimer, the term of this patent is extended or adjusted under 35 U.S.C. 154(b) by 67 days.

(21) Appl. No.: 15/358,795

(22) Filed: Nov. 22, 2016

(65) Prior Publication Data

US 2018/0140975 A1     May 24, 2018

(51) Int. Cl.
| | |
|---|---|
| *F02M 37/04* | (2006.01) |
| *B01D 29/56* | (2006.01) |
| *B01D 35/00* | (2006.01) |
| *B01D 35/26* | (2006.01) |
| *B01D 29/60* | (2006.01) |
| *B01D 29/90* | (2006.01) |
| *F02M 37/18* | (2006.01) |
| *F02M 37/22* | (2006.01) |

(52) U.S. Cl.
CPC ......... *B01D 29/56* (2013.01); *B01D 29/603* (2013.01); *B01D 29/902* (2013.01); *B01D 35/005* (2013.01); *B01D 35/26* (2013.01); *F02M 37/18* (2013.01); *F02M 37/22* (2013.01)

(58) Field of Classification Search
CPC .... F02M 37/0052; F02M 37/18; F02M 37/22; B01D 29/56; B01D 29/603; B01D 29/90; B01D 35/005
See application file for complete search history.

(56) References Cited

U.S. PATENT DOCUMENTS

| | | | |
|---|---|---|---|
| 5,708,201 A | 1/1998 | Kaub | |
| 9,038,657 B2 | 5/2015 | Wilkinson et al. | |
| 2004/0118764 A1* | 6/2004 | Miller | B01D 35/26 210/258 |
| 2014/0224215 A1 | 8/2014 | Lehman et al. | |
| 2014/0331974 A1* | 11/2014 | Ahmad | F02M 37/04 123/495 |

FOREIGN PATENT DOCUMENTS

| | | |
|---|---|---|
| DE | 10345225 B4 | 11/2005 |
| DE | 202005017702 U1 | 3/2006 |
| DE | 102010016212 A1 | 11/2010 |
| DE | 102009052597 A1 | 5/2011 |
| WO | 2006002800 A1 | 1/2006 |
| WO | 2015056045 A1 | 4/2015 |

* cited by examiner

*Primary Examiner* — Terry K Cecil
(74) *Attorney, Agent, or Firm* — Miller, Matthias & Hull

(57) ABSTRACT

A filtration system is provided. The system provides a first filtration loop that provides one or more passes through a first filter using a first pump and a second filtration loop that provides one or more passes through a second filter using a second pump. The combination of a first pump and a second pump, each with a filter and each running independently of engine speed, provides an effective means of cleaning fuel.

20 Claims, 5 Drawing Sheets

US 10,029,193 B2

DUAL LOOP FUEL FILTRATION SYSTEM WITH CONTROLLER

TECHNICAL FIELD

The present disclosure relates generally to a filtration system, and, more particularly, to a filtration system in which a first pump located in a first filtration loop and a second pump located in a second filtration loop may run independently of engine speed, thereby recirculating and filtering an amount of fuel much greater than the amount of fuel being consumed by the engine.

BACKGROUND

Modern engine fuel systems require high operating pressures to produce acceptable performance and emissions. The high pressures require small clearances between parts to minimize leakage and other factors that can adversely impact performance. Debris in fuel can be of such a size that it can damage the internal parts of the fuel system, reducing performance of the fuel system and engine.

Fuel filtration systems are known that remove debris from fuel using a recirculation filtration loop. For example, U.S. Patent Publication No. 2014/0224215 discloses a system for removing debris from fuel using a single recirculation fuel loop. The system includes a pump configured to receive a flow of fuel from a fuel tank, a first filter and a recirculation loop configured to recirculate at least a portion of the fuel through the first filter. At least one additional filter may be positioned downstream of the system. While effective for its intended purposes, improvements in fuel filtration systems continue to be sought.

The present disclosure presents a system for removing debris from fluids such as fuel. The system uses multiple recirculating loops to filter an amount of fuel many more times that being consumed by an engine. While a number of exemplary configurations are described herein, it should be appreciated that the examples are not a limitation on the scope of this disclosure or of the attached claims except to the extent expressly noted.

SUMMARY

According to an aspect of the disclosure, a filtration system for use with an engine configured to operate at a range of speeds comprises a first filtration loop and a second filtration loop. The first filtration loop comprises a first filter having a first filter inlet port and a first filter outlet port, a first motor and a first pump operatively coupled to the first motor. An outlet port of the first pump is fluidly coupled to the first filter inlet port via a first filter inlet conduit. An inlet port of the first pump is fluidly coupled to the first filter outlet port via a first filter outlet conduit and a first recirculation conduit. The second filtration loop comprises a second filter having a second filter inlet port and a second filter outlet port and a second pump. An inlet port of the second pump is fluidly coupled to the first filter outlet port via the first filter outlet conduit and an interloop conduit. An outlet port of the second pump is fluidly coupled to the second filter inlet port via a second filter inlet conduit. The inlet port of the second pump is fluidly coupled to the second filter outlet port via a second filter outlet conduit, a second recirculation conduit fluidly coupled to the second filter outlet conduit upstream of the engine and a portion of the interloop conduit. A first flow meter may be fluidly coupled to the interloop conduit for measuring flow through the interloop conduit. An optional second flow meter may be located downstream of the engine for measuring the flow of fuel exiting the engine. A controller may be operatively coupled to the first flow meter, the second flow meter and the first motor. The controller may be configured to operate the first motor, and thus the first pump and the second pump, whereby fuel is distributed between the first filtration loop and the second filtration loop.

According to another aspect of the disclosure, a filtration system for use with an engine configured to operate at a range of speeds comprises a first filtration loop and a second filtration loop, the first filtration loop comprising a first filter having a first filter inlet port and a first filter outlet port, a first motor, and a first pump operatively coupled to the first motor, an outlet port of the first pump being fluidly coupled to the first filter inlet port via a first filter inlet conduit, an inlet port of the first pump being fluidly coupled to the first filter outlet port via a first filter outlet conduit and a first recirculation conduit. The second filtration loop comprises a second filter having a second filter inlet port and a second pump. An inlet port of the second pump may be fluidly coupled to the first filter outlet port via the first filter outlet conduit and an interloop conduit. An outlet port of the second pump may be fluidly coupled to the second filter inlet port via a second filter inlet conduit. The inlet port of the second pump may be fluidly coupled to the outlet port of the second filter via the second filter outlet conduit, an alternative second recirculation conduit fluidly coupled to an engine fuel outlet and a portion of the interloop conduit. A first flow meter may be fluidly coupled to the interloop conduit for measuring flow through the interloop conduit and a second flow meter may be located downstream of the engine for measuring the flow of fuel exiting the engine. A controller may be operatively coupled to the first flow meter, the second flow meter and the first motor. The controller may be configured to operate the first motor, and thus the first pump and the second pump, whereby fuel is distributed between the first filtration loop and the second filtration loop.

According to another aspect of the disclosure, a machine comprises an engine configured to operate at a range of speeds, a fuel tank and a filtration system comprising a first filtration loop and a second filtration loop. The first filtration loop may comprise a first filter having a first filter inlet port and a first filter outlet port, a first motor and a first pump operatively coupled to the first motor. An outlet port of the first pump may be fluidly coupled to the first filter inlet port via a first filter inlet conduit. An inlet port of the first pump may be fluidly coupled to the first filter outlet port via a first filter outlet conduit and a first recirculation conduit. The second filtration loop may comprise a second filter having a second filter inlet port and a second pump. An inlet port of the second pump may be fluidly coupled to the first filter outlet port via the first filter outlet conduit and an interloop conduit. An outlet port of the second pump may be fluidly coupled to the second filter inlet port via a second filter inlet conduit. The inlet port of the second pump may be fluidly coupled to the second filter outlet port via a second filter outlet conduit, a second recirculation conduit fluidly coupled to the second filter outlet conduit upstream of the engine and a portion of the interloop conduit. A first flow meter may be fluidly coupled to the interloop conduit for measuring flow through the interloop conduit. A second flow meter may be located downstream of the engine for measuring the flow of fuel exiting the engine. A controller may be operatively coupled to the first flow meter, the second flow meter and the first motor. The controller may be configured to operate the first motor, and thus the first pump and the second pump, whereby fuel is distributed between the first filtration loop and the second filtration loop.

Other aspects and features of the disclosed systems and methods will be appreciated from reading the attached detailed description in conjunction with the included drawing figures. Moreover, selected aspects and features of one example embodiment may be combined with various selected aspects and features of other example embodiments.

BRIEF DESCRIPTION OF THE DRAWINGS

For further understanding of the disclosed concepts and embodiments, reference may be made to the following detailed description, read in connection with the drawings, wherein like elements are numbered alike, and in which.

It is to be noted that the appended drawings illustrate only typical embodiments and are therefore not to be considered limiting with respect to the scope of the disclosure or claims. Rather, the concepts of the present disclosure may apply within other equally effective embodiments. Moreover, the drawings are not necessarily to scale, emphasis generally being placed upon illustrating the principles of certain embodiments.

DETAILED DESCRIPTION

Figure 1:
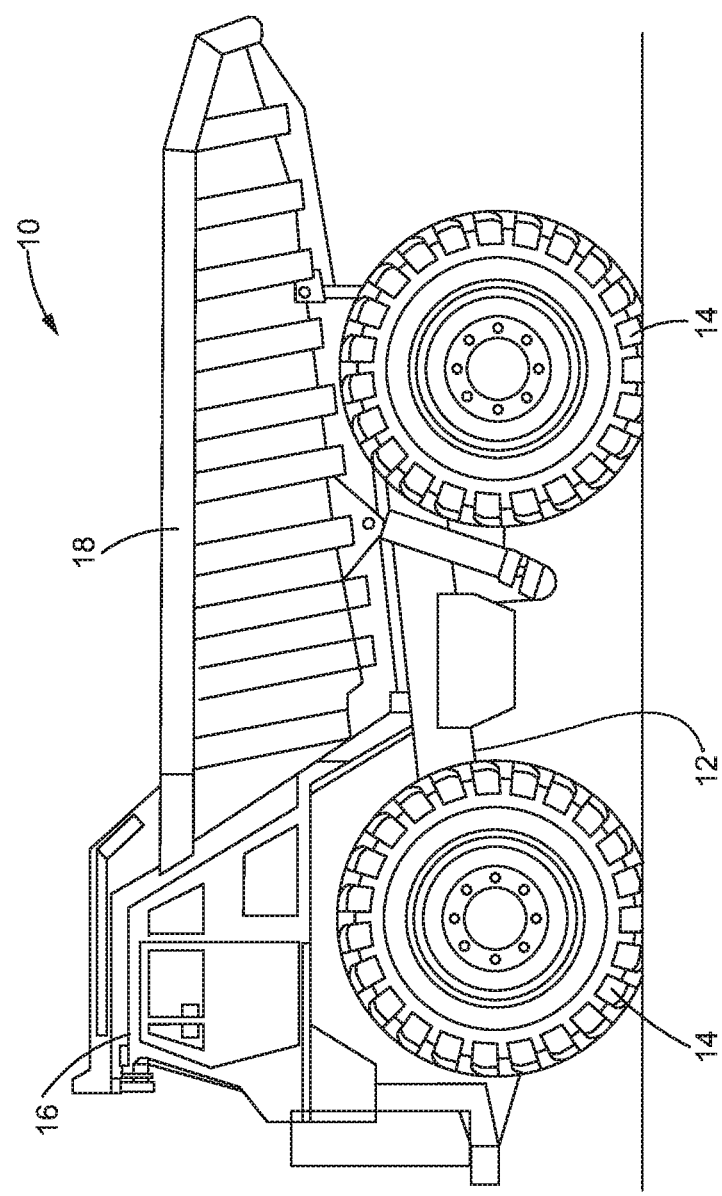
FIG. 1 is a side view of an exemplary machine, according to one embodiment of the present disclosure.

An exemplary embodiment of a machine 10 according to the present disclosure is shown in FIG. 1. The machine 10 may be a mining truck, as shown, or may be any off-highway or on-highway vehicle using a fuel-powered engine, as described herein. The machine 10 generally includes a machine frame 12 for supporting, among other systems and components, a filtration system which will be discussed in greater detail in connection with FIGS. 2 and 3.

The machine 10 may also include a plurality of ground-engaging elements 14, in this case wheels. As should be appreciated by one of ordinary skill in the art, an engine may provide propulsion power for the ground-engaging elements 14 and may power a variety of other machine systems, including various mechanical, electrical, and hydraulic systems and/or components. The machine 10 may also include an operator control station 16 including a variety of operator controls and displays useful for operating the machine 10 and/or a dump body 18 which may be pivotal relative to the machine frame 12.

First Embodiment

Figure 2:
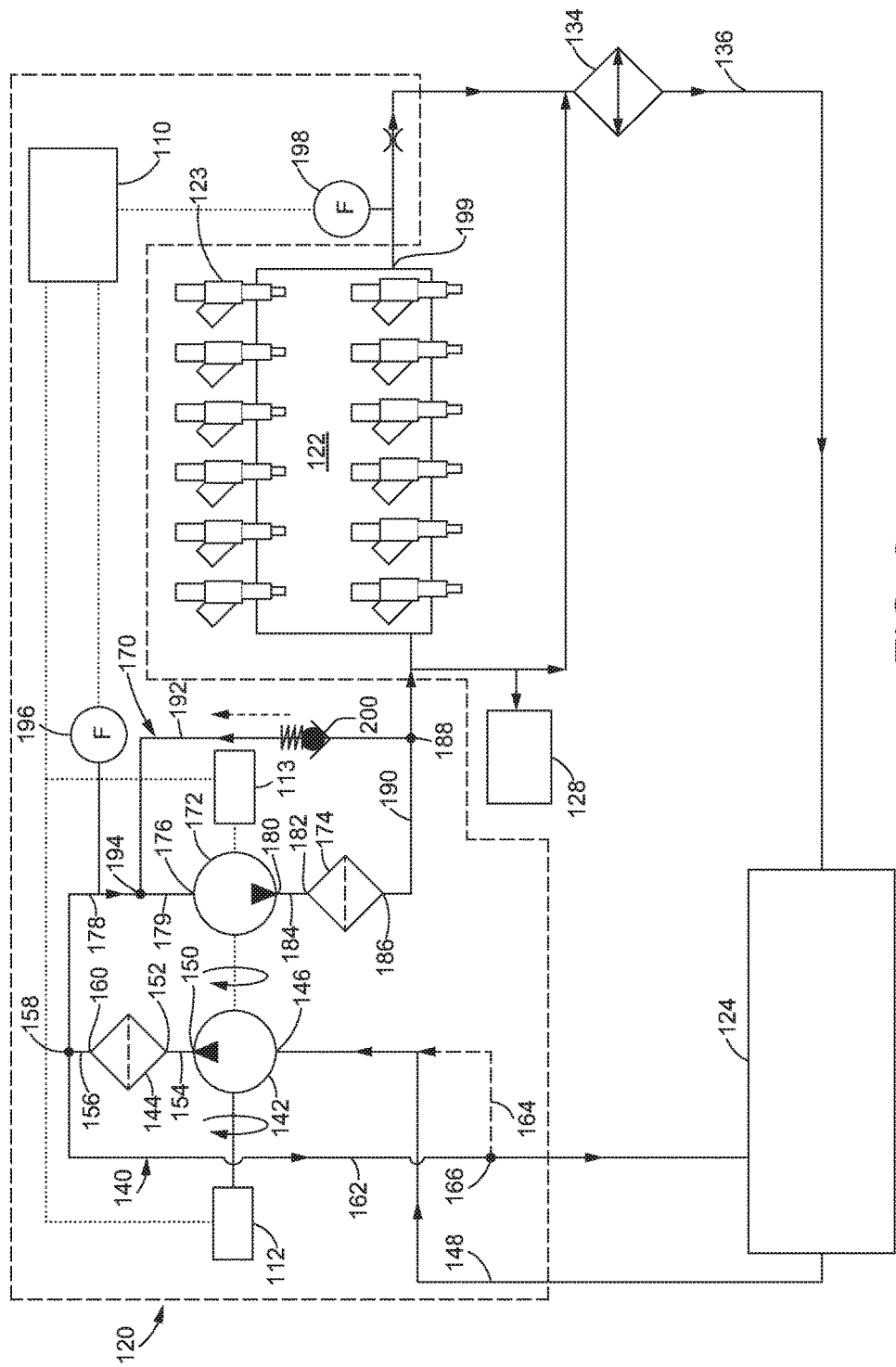
FIG. 2 is a schematic drawing of an exemplary configuration of a filtration system.

FIG. 2 illustrates an exemplary configuration of a filtration system 120 that may be used with the machine 10 of FIG. 1 or any suitable machine, including but not limited to mining trucks, earth moving equipment, on and off highway trucks, construction machines, stationary engines and marine vessels. The direction of fuel flow is indicated by arrowheads in the figures.

In the configuration depicted in FIG. 2, fuel is pumped across at least two separate filters. Fuel passing through a first filter 144 may be split into a first stream that is recirculated back through the first filter 144 via a first filtration loop 140 and into a second stream that passes through a second filter 174. Fuel passing through the second filter 174 may be split into a fuel stream that is recirculated back through the second filter 174 via a second filtration loop 170 and into a fuel stream that may enter the engine 122. The amount of fuel passing through each of the first and second filters 144, 174 may be a function of the design flow rates of the first and second pumps 142, 172, with the first pump 142 having a higher design flow rate than the second pump 172. As a result, a volume of fuel entering the first filtration loop 140 will likely flow through the first filter 144 multiple times before advancing to the second filtration loop 170. And a volume of fuel entering the second filtration loop 170 will likely flow through the second filter 174 multiple times before advancing to the engine 122, thereby improving the quality of the fuel with each successive pass through the first filter 144 and the second filter 174.

The first filtration loop 140 may include a first pump 142, a first filter 144 and a first motor 112. An inlet port 146 to the first pump 142 may be fluidly coupled to the fuel tank 124 via a first conduit 148. An outlet port 150 from the first pump 142 may be fluidly coupled to an inlet port 152 of the first filter 144 via a first filter inlet conduit 154. An outlet port 160 of the first filter 144 may be fluidly coupled to a first node 158 by a first filter outlet conduit 156.

The first node 158 may be fluidly coupled to the first pump inlet port 146 via a first recirculation conduit 162, the fuel tank 124 and the first conduit 148. Thus, the first filter inlet conduit 154, the first filter outlet conduit 156, the first recirculation conduit 162, the fuel tank 124 and the first conduit 148 may form a first filtration loop 140 about the first pump 142, which includes the first filter 144.

Alternatively, the first node 158 may be fluidly coupled to the first pump inlet port 146 via a portion of the first recirculation conduit 162 and an alternative first recirculation conduit 164 that bypasses the fuel tank 124. Thus, the first filtration loop 140 may bypass the fuel tank 124. The alternative fuel recirculation conduit 164 may be fluidly coupled to the first recirculation conduit 162 at a second node 166 between the first filter outlet port 160 and the fuel tank 124. Thus, in this alternative configuration, the first filter inlet conduit 154, the first filter outlet conduit 156, a portion of the first recirculation conduit 162 between the first node 158 and the second node 166 and the alternative first recirculation conduit 164 may form the first filtration loop 140 about the first pump 142.

The second filtration loop 170 may include a second pump 172 and a second filter 174. An inlet port 176 to the second pump 172 may be fluidly coupled to the first node 158 via an interloop conduit 178. An outlet port 180 from the second pump 172 is fluidly coupled to an inlet port 182 of the second filter 174 via a second filter inlet conduit 184. A second filter outlet conduit 190 may be fluidly coupled to the second filter outlet port 186 and to a third node 188 located upstream of the engine 122. A second recirculation conduit 192 is fluidly coupled to the third node 188 and to a fourth node 194 located in the interloop conduit 178. The fourth node 194 may be located between the first node 158 and the second pump inlet port 176. Thus, the second filter outlet port 186 is fluidly coupled to the second pump inlet port 176 via the second filter outlet conduit 190, the second recirculation conduit 192 and a portion 179 of the interloop conduit 178 downstream of the fourth node 194. Accordingly, the second filter inlet conduit 184, the second filter outlet conduit 190, the second recirculation conduit 192 and the portion 179 of the interloop conduit 178 between the fourth node 194 and the second pump inlet port 176 form the second filtration loop 170 about the second pump 172, which includes the second filter 174.

As noted above, the second filtration loop 170 fluidly connects the second filter outlet port 186 to an inlet port 176 of the second pump 172, bypassing the engine 122, and thus is configured to carry a portion of the fuel exiting the second filter 174 back to the second pump 172 and back through the second filter 174. A first check valve 200 may be positioned in the second filtration loop 170 and, more particularly, in the second recirculation conduit 192.

The engine 122 may be an internal combustion engine such as a diesel engine and may comprise injectors 123. The engine 122, the fuel tank 124, the first filtration loop 140 and the second filtration loop 170 are fluidly coupled such that the first and second filtration loops 140, 170 may be provided downstream of the fuel tank 124 and upstream of the engine 122.

An excess of fuel may be sent to the engine 122 to provide injector cooling and assure that enough fuel is getting to the injectors 123 to provide the desired power. The injectors 123 supply fuel to the engine 122 to produce power, while excess fuel passes around the injectors 123 and may be used for cooling the injectors 123 and/or for cooling other components such as high pressure pumps.

The first pump 142 may be a relatively lower pressure, higher flow pump and may be an impeller pump or another type of pump, such as a roller pump, gear pump or gerotor pump. The first pump 142 is driven by (and operatively coupled to) the first motor 112 and may be fluidly connected to the fuel tank 124 in order to receive the fuel stored in the fuel tank 124.

The second pump 172 may be a relatively higher pressure, lower flow pump and may be a gerotor pump or any suitable pump. The second pump 172 is configured to pressurize the fuel flowing towards the engine 122. The second pump 172 may be powered by the same first motor 112 as the first pump 142 or a different (second) motor 113. If powered by the same first motor 112, the first pump 142 may be physically configured to produce a larger flow rate that the second pump 172. Alternatively, the first motor 112 may include gearing such that the second pump 172 may operate at a different speed than the first pump 142. Alternatively, the pumps themselves, or the mechanical connection between the pumps, may incorporate gearing configurations that allow the pumps to operate at different speeds. Both first and second motors 112, 113 may run independently of engine speed and may have power demands that the controller 110 can measure and compare with pre-programmed values to determine conditions in the filtration system 120, such as fuel filter loading and pump wear. If the measured versus expected values exceed certain ranges, then the controller 110 can make appropriate notifications to the machine operator.

The interloop conduit 178 extends from the first node 158 to the second pump inlet port 176 and fluidly connects the first filtration loop 140 downstream of the first filter 144 to the second pump 172. The second pump 172 draws fuel through the interloop conduit 178 from the first filtration loop 140. The amount of fuel drawn from the first filtration loop 140 equals whatever fuel the engine 122 requires, that is whatever the engine 122 is burning, plus whatever fuel is needed for auxiliary functions, such as injector cooling and emissions control.

A first flow meter 196 may be fluidly coupled to the interloop conduit 178 and may measure fuel flow through the interloop conduit 178 upstream of the fourth node 194. The first flow meter 196 may be operably coupled to the controller 110 and may transmit a signal to the controller 110 regarding flow rate.

An optional second flow meter 198 located downstream of the engine fuel outlet 199 measures fuel flow exiting the engine 122 and may function to assure that a sufficient amount of fuel is passing through the engine 122 to provide good injector cooling and to provide for combustion and auxiliary functions (such as emission control). The second flow meter 198 may be operably coupled to the controller 110 and may transmit a signal to the controller 110 regarding flow rate.

The controller 110 may be operatively coupled, either directly or indirectly through another component, to the first flow meter 196, the second flow meter 198 and to the first and second motor(s) 112, 113 driving the first pump 142 and the second pump 172. The first and second motor(s) 112, 113 may be variable speed motors and the controller 110 may be configured to vary the speed of the first and second motor(s) 112, 113 based on various factors, including the speed and fuel consumption of the engine 122. The controller 110 may monitor the fuel consumption of the engine 122 and then adjust the first and second motor(s) 112, 113 to properly distribute the fuel between the first filtration loop 140 and the second filtration loop 170 independently of engine speed.

The controller 110 may be any controller or processor suitable for effectively controlling the dual loop filtration system 120. The controller 110 may include electronics, preprogrammed logic circuits, data processing circuits, memory, software, firmware, input/output processing circuits, combinations thereof, and any other controller components known in the art. The controller 110 may be modular or unitary and may be fastened to the machine 10 in any suitable manner or location. The controller 110 may receive power from a power source (not shown) via a power conduit or the like.

Auxiliary units may include an emissions module 128 and a heat exchanger 134. The emissions module 128 may run only when necessary, but when it does, it requires fuel. Within one type of exemplary emissions module 128, fuel is sprayed on an igniter and fuel is burned, generating heat that is sent down an exhaust pipe (not shown) to burn excess particulates in a diesel particulate filter located in the exhaust line. The heat exchanger 134 may be used to pre-heat the fuel entering the engine 122 while cooling the fuel that flows back to the fuel tank 124 via a return conduit 136. The first filtration loop 140 and the second filtration loop 170 provide the fuel required by the emissions module 128 and the heat exchanger 134.

Figure 4:
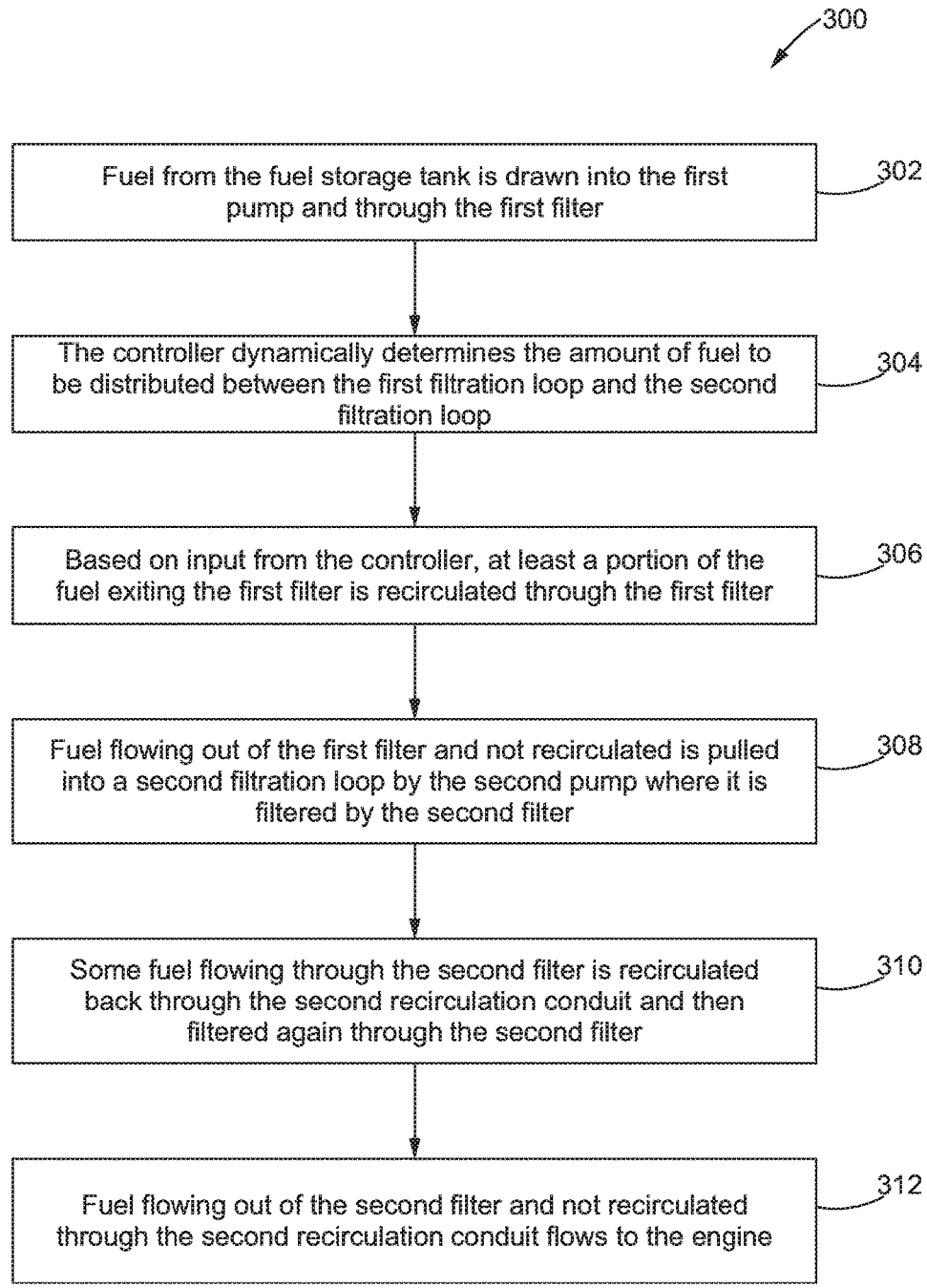
FIG. 4 is a flow chart of a method for fuel filtration using the system of FIG. 2.

FIG. 4 illustrates a method 300 of fuel filtration using the dual loop filtration system 120 of FIG. 2. The method 300 may comprise the following steps:

Step 302: Fuel from the fuel tank 124 is drawn into the first pump 142 and then through the first filter 144 located on the pressure side of the first pump 142. A portion of the fuel coming off the first filter 144 is recirculated through the first filter 144, while the remaining portion flows into the second filtration loop 170 via the interloop conduit 178. In the second filtration loop 170 the fuel flows through the second pump 172 and through the second filter 174 and then is split so that a portion flows back through the second filter 174 via a second recirculation conduit 192 and the remaining portion flows to the engine 122.

Step 304: The controller 110 adjusts the speed of the first motor 112 and, if present, the second motor 113, to distribute the fuel between the first filtration loop 140 and the second filtration loop 170.

Step 306: Based on input from the controller 110, at least a portion of the fuel exiting the first filter 144 is recirculated back to the first filter 144 via the first recirculation conduit 162 or the alternative first recirculation conduit 164.

Step 308: The fuel flowing out of the first filter 144 and not recirculated through first filter 144 is drawn into the second pump 172 via the interloop conduit 178 and then filtered through the second filter 174.

Step 310: Some fuel flowing through the second filter 174 may be recirculated back through the second filter 174.

Step 312: The fuel flowing out of the second filter 174 and not recirculated back though the second filter 174 flows to the engine 122.

Step 314: Some fuel flowing through the engine 122 may avoid combustion and exit the engine 122. All or a portion of the fuel exiting the engine 122 may flow back to the fuel tank 124 via return conduit 136.

The second pump 172 sends fuel to the engine 122 and auxiliary units, and the first filtration loop 140 recirculates whatever fuel the engine 122 and any auxiliary units (such as the emissions module 128) do not consume.

Second Embodiment

Figure 3:
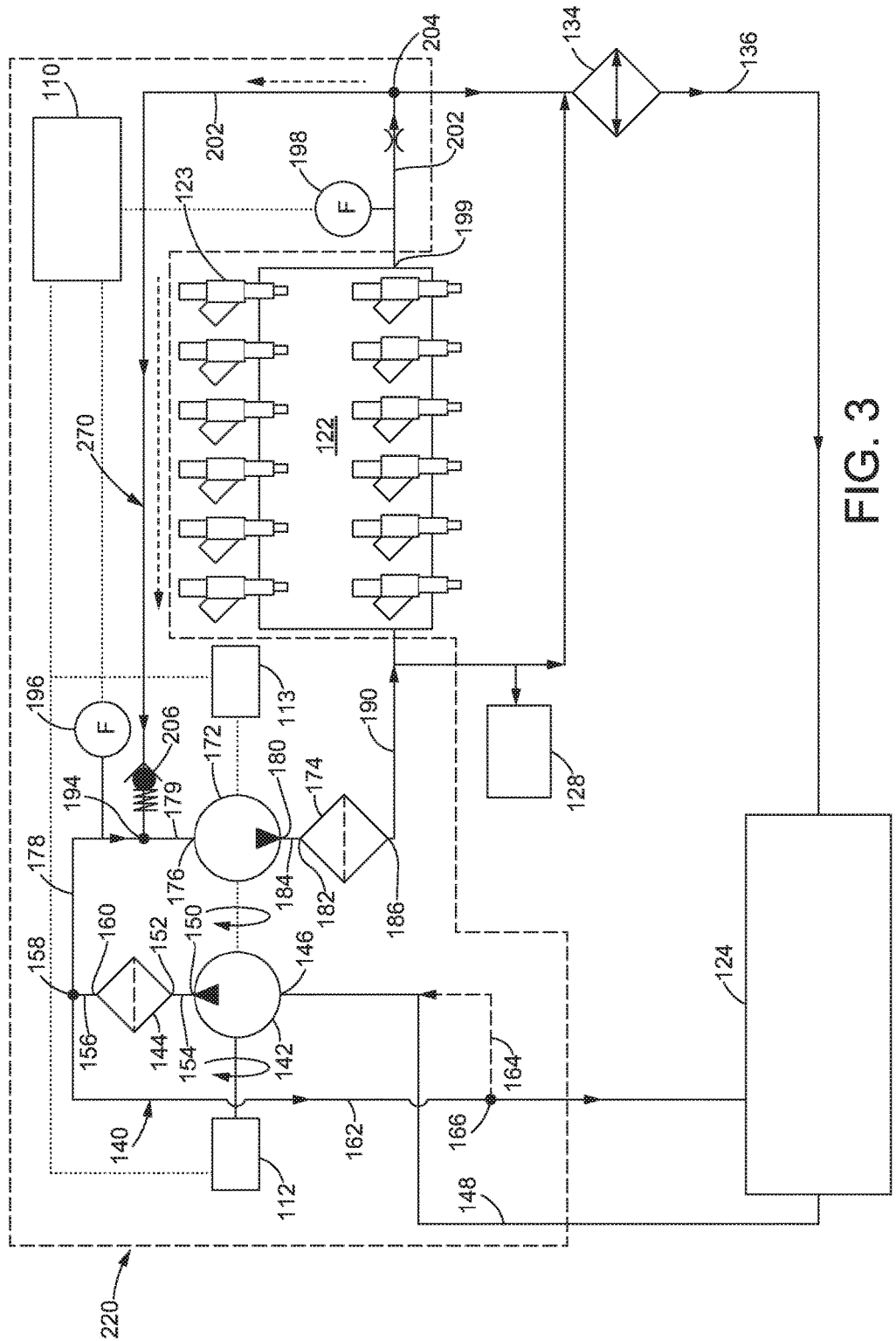
FIG. 3 is a schematic drawing of another exemplary configuration of a filtration system.

FIG. 3 illustrates an exemplary embodiment of an alternative filtration system 220. As with the previous embodiment, fuel is pumped across a first pump 142 via a first filtration loop 140. In this embodiment, fuel is pumped across a second pump 172 via an alternative second filtration loop 270. Also like the previous embodiment, the first filtration loop 140 allows a flow of fuel from the first filter 144 to be recirculated back through the first filter 144. However, in this embodiment, the second recirculation conduit 192 of FIG. 2 is eliminated and an alternative second recirculation conduit 202 added. The alternative second recirculation conduit 202 fluidly connects the fuel outlet 199 of the engine 122 to a fifth node 204 downstream of the engine fuel outlet 199 and then to the fourth node 194 located in the interloop conduit 178 upstream of the second pump 172.

Still referring to FIG. 3, the alternative second filtration loop 270 may include a second pump 172 and a second filter 174. An inlet port 176 to the second pump 172 may be fluidly coupled to the fourth node 194 node via a portion 179 of the interloop conduit 178. The second pump outlet port 180 is fluidly coupled to the second filter inlet port 182 via the second filter inlet conduit 184. The second filter outlet port 186 is fluidly coupled to the engine 122 via a second filter outlet conduit 190. The engine fuel outlet 199 is fluidly coupled to the second pump inlet port 176 via the alternative second recirculation conduit 202 and the portion 179 of the interloop conduit 178 between the fourth node 194 and the second pump inlet port 176. Accordingly, the second filter inlet conduit 184, the second filter outlet conduit 190, the alternative second recirculation conduit 202 and the portion 179 of the interloop conduit 178 between the fourth node 194 and the second pump inlet port 176 form the alternative second filtration loop 270 about the second pump 172, which includes the second filter 174.

As noted above, the alternative second recirculation conduit 202 fluidly connects the engine fuel outlet 199 to the fourth node 194 and thus to an inlet port 176 of the second pump 172. A second check valve 206 may be positioned in the alternative second filtration loop 270 and, more specifically, in the alternative second recirculation conduit 202.

As in the previous embodiment, the interloop conduit 178 fluidly connects the first filtration loop 140 downstream of the first filter 144 to the second pump 172. The second pump 172 draws fuel through the interloop conduit 178 from the first filtration loop 140.

As in the first embodiment, the first flow meter 196 measures fuel flow through the interloop conduit 178, which is the only fluid link between the two filtration loops 140, 170. The first flow meter 196 may be operably connected to the controller 110.

Also as in the first embodiment, a second flow meter 198 located at or near the engine fuel outlet 199 may function to assure that a sufficient amount of fuel is passing through the engine 122 to provide sufficient fuel for engine consumption, injector cooling, and also for auxiliary functions (such as emission control).

The controller 110 may be communicably coupled to the first flow meter 196, the second flow meter 198 and to the first and second motor(s) 112, 113 driving the first pump 142 and the second pump 172. The controller 110 may monitor the fuel consumption of the engine 122 and then adjust the first and second motor(s) 112, 113 to properly distribute the fuel between the first filtration loop 140 and the alternative second filtration loop 270.

Figure 5:
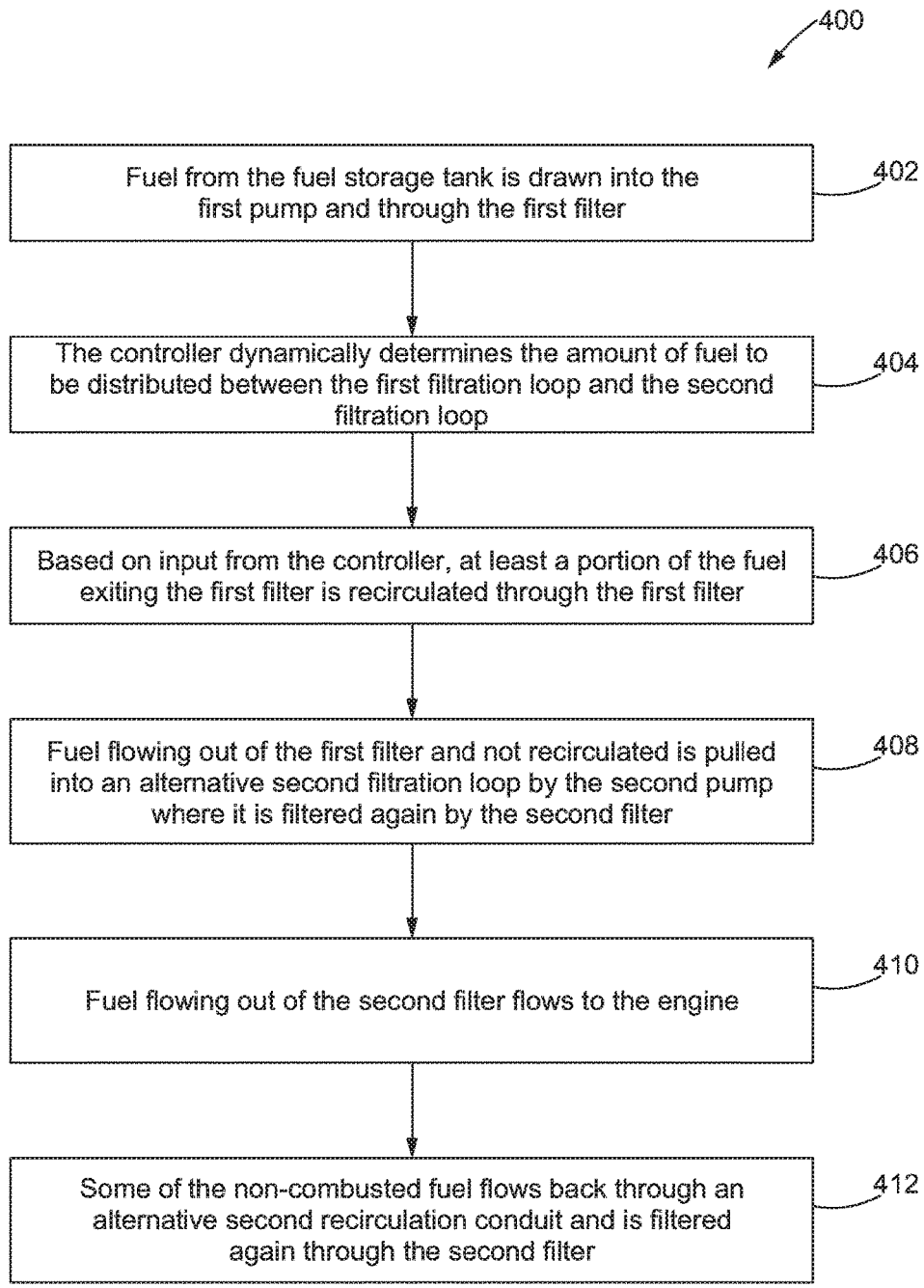
FIG. 5 is a flow chart of a method for fuel filtration using the system of FIG. 3.

FIG. 5 illustrates a method 400 of fuel filtration using the filtration system 220 of FIG. 3. The method 400 may comprise the following steps:

Step 402: Fuel from the fuel tank 124 is drawn into the first pump 142 and then through the first filter 144 located on the pressure side of the first pump 142. A portion of the fuel exiting the first filter 144 may be recirculated through the first filter 144 while a remaining portion flows into the alternative second filtration loop 270. In the alternative second filtration loop 270 the fuel flows through the second pump 172 and then through the second filter 174.

Step 404: The controller 110 adjusts the speed of the first motor 112 and, if present, the second motor 113, to distribute the fuel between the first filtration loop 140 and the second filtration loop 270.

Step 406: Based on input from the controller 110, at least a portion of the fuel exiting the first filter 144 is recirculated via the first recirculation conduit 162 or the alternative fuel recirculation conduit 164 to the first filter 144.

Step 408: The fuel flowing out of the first filter 144 and not recirculated through the first filter 144 is pulled or drawn into the second pump 172 and then filtered through a second filter 174 via the interloop conduit 178.

Step 410: Fuel flowing out of the second filter 174 flows to the engine 122.

Step 412: Some fuel flowing through the engine 122 may avoid combustion and exit the engine 122. Some of this fuel may flow back through an alternative second recirculation conduit 202 and then through the second pump 172 and is filtered again through the second filter 174.

Step 414: A portion of the fuel exiting the engine 122 may flow back to the fuel tank 124 via a return conduit 136.

Although the dual loop filtration system 120, 220 has been described herein with respect to fuel, it should be understood that the system could be used to filter other fluids, such as hydraulic fluids, coolants and lubricating oils. Unless specified otherwise, the term 'fluid" may be used to describe liquids, gases, slurries, suspensions and combinations thereof, or any other similar flowable substances.

INDUSTRIAL APPLICABILITY

In operation, the teachings of the present disclosure may find applicability in many industries including, but not limited to, mining trucks, earth moving equipment, on and off highway trucks, construction machines, stationary engines, marine vessels and the like. The filtration system of the disclosure functions as a highly efficient fuel debris removal system, and may be used with diesel engines or perhaps with gasoline engines. The system provides an internal recirculating loop that provides multiple fuel passes through a first filter and a second filtration loop that provides one or more passes through a second filter using a second pump. The combination of a first impeller pump and a second gerotor pump, each with a filter, provides an extremely effective means of cleaning fuel.

The filtration system takes a first filtration loop comprising a low pressure, high flow pump and a first filter adds a second filtration loop comprising a high pressure, low flow pump that provides the necessary high pressure for engine requirements and a second filter.

Previous fuel systems filter the fuel before it is sent to the engine using a fuel pump that runs off of the engine speed. In the present system, the second (gerotor) pump may run off of the first (impeller) pump and thus may run independently of engine speed.

While the present disclosure has shown and described details of exemplary embodiments, it will be understood by one skilled in the art that various changes in detail may be effected therein without departing from the spirit and scope of the disclosure as defined by claims supported by the written description and drawings. Further, where these exemplary embodiments (and other related derivations) are described with reference to a certain number of elements it will be understood that other exemplary embodiments may be practiced utilizing either less than or more than the certain number of elements.

The invention claimed is:

1. A filtration system for use with an engine configured to operate at a range of engine speeds, the filtration system comprising:
    a first filtration loop comprising:
        a first filter having a first filter inlet port and a first filter outlet port;
        a first motor that runs independently of engine speed; and
        a first pump operatively coupled to the first motor, an outlet port of the first pump being fluidly coupled to the first filter inlet port via a first filter inlet conduit, an inlet port of the first pump being fluidly coupled to the first filter outlet port via a first filter outlet conduit and a first recirculation conduit;
    a second filtration loop comprising:
        a second filter having a second filter inlet port and a second filter outlet port; and
        a second pump, an inlet port of the second pump being fluidly coupled to the first filter outlet port via the first filter outlet conduit and an interloop conduit, an outlet port of the second pump being fluidly coupled to the second filter inlet port via a second filter inlet conduit, the inlet port of the second pump being fluidly coupled to the second filter outlet port via a second filter outlet conduit, a second recirculation conduit fluidly coupled to the second filter outlet conduit upstream of the engine and a portion of the interloop conduit;
    a first flow meter fluidly coupled to the interloop conduit for measuring flow through the interloop conduit; and
    a controller operatively coupled to the first flow meter and the first motor, the controller being configured to operate the first pump at a flow rate that is higher than a flowrate of the second pump, whereby fuel is distributed between the first filtration loop and the second filtration loop.

2. The filtration system of claim 1 wherein the second pump is operatively coupled to the first motor.

3. The filtration system of claim 1 wherein the second pump is operably coupled to a second motor that runs independently of engine speed, and the controller is operatively coupled to the second motor.

4. The filtration system of claim 1 wherein the first recirculation conduit is fluidly connected to a fuel tank.

5. The filtration system of claim 1 further comprising a fuel tank, wherein the first recirculation conduit bypasses the fuel tank.

6. The filtration system of claim 1 further comprising a check valve positioned in the second recirculation conduit.

7. The filtration system of claim 1 further comprising auxiliary units fluidly coupled to the second pump.

8. The filtration system of claim 7 wherein the auxiliary units comprise an emissions module.

9. A filtration system for use with an engine configured to operate at a range of engine speeds, the filtration system comprising:
    a first filtration loop comprising:
        a first filter having a first filter inlet port and a first filter outlet port;
        a first motor that runs independently of engine speed; and
        a first pump operatively coupled to the first motor, an outlet port of the first pump being fluidly coupled to the first filter inlet port via a first filter inlet conduit, an inlet port of the first pump being fluidly coupled to the first filter outlet port via a first filter outlet conduit and a first recirculation conduit;
    an alternative second filtration loop comprising:
        a second filter having a second filter inlet port and a second filter outlet port, the second filter outlet port being fluidly coupled to the engine via a second filter outlet conduit; and
        a second pump, an inlet port of the second pump being fluidly coupled to the first filter outlet port via the first filter outlet conduit and an interloop conduit, an outlet port of the second pump being fluidly coupled to the second filter inlet port via a second filter inlet conduit, the inlet port of the second pump being fluidly coupled to the outlet port of the second filter via the second filter outlet conduit, an alternative second recirculation conduit fluidly coupled to an engine outlet and to a node located in the interloop conduit, and a portion of the interloop conduit;
    a first flow meter fluidly coupled to the interloop conduit for measuring flow through the interloop conduit; and
    a controller operatively coupled to the first flow meter and the first motor, the controller being configured to operate the first pump at a flow rate that is higher than a flowrate of the second pump, whereby fuel is distributed between the first filtration loop and the alternative second filtration loop.

10. The filtration system of claim 9 wherein the second pump is operatively coupled to the first motor.

11. The filtration system of claim 9 wherein the second pump is operatively coupled to a second motor that runs independently of engine speed, and the controller is operatively coupled to the second motor.

12. The filtration system of claim 9 wherein the first recirculation conduit is fluidly connected to a fuel tank.

13. The filtration system of claim 9 further comprising a fuel tank, wherein the first recirculation conduit bypasses the fuel tank.

14. The filtration system of claim 9 further comprising a check valve positioned in the alternative second recirculation conduit.

15. The filtration system of claim 9 wherein the alternative second recirculation conduit carries fuel exiting the engine to the inlet port of the second pump.

16. The filtration system of claim 9 further comprising auxiliary units fluidly coupled to the second pump.

17. The filtration system of claim 16 wherein the auxiliary units comprise an emissions module.

18. A machine comprising:
an engine configured to operate at a range of speeds;
a filtration system comprising:
    a first filtration loop comprising:
        a first filter having a first filter inlet port and a first filter outlet port;
        a first motor that runs independently of engine speed; and
        a first pump operatively coupled to the first motor, an outlet port of the first pump being fluidly coupled to the first filter inlet port via a first filter inlet conduit, an inlet port of the first pump being fluidly coupled to the first filter outlet port via a first filter outlet conduit and a first recirculation conduit; and
    a second filtration loop comprising:
        a second filter having a second filter inlet port and a second filter outlet port; and
        a second pump, an inlet port of the second pump being fluidly coupled to the first filter outlet port via the first filter outlet conduit and an interloop conduit, an outlet port of the second pump being fluidly coupled to the second filter inlet port via a second filter inlet conduit, the inlet port of the second pump being fluidly coupled to the second filter outlet port via a second filter outlet conduit, a second recirculation conduit fluidly coupled to the second filter outlet conduit upstream of the engine and a portion of the interloop conduit;
    a first flow meter fluidly coupled to the interloop conduit for measuring flow through the interloop conduit; and
    a controller operatively coupled to the first flow meter and the first motor, the controller being configured to operate the first pump at a flow rate that is higher than a flowrate of the second pump, whereby fuel is distributed between the first filtration loop and the second filtration loop independently of engine speed.

19. The machine of claim 18 wherein the second pump is operatively coupled to the first motor.

20. The machine of claim 18 further comprising a second motor that runs independently of engine speed and is operatively coupled to the second pump, wherein the controller is operatively coupled to the second motor.

* * * * *